July 18, 1967   J. B. GUIN   3,331,423
AUTOMOBILE TIRES

Filed June 11, 1965

INVENTOR.
JOEL B. GUIN

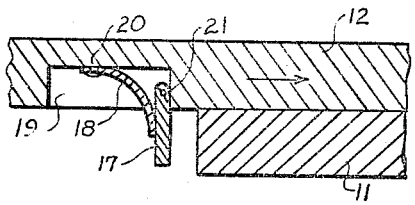
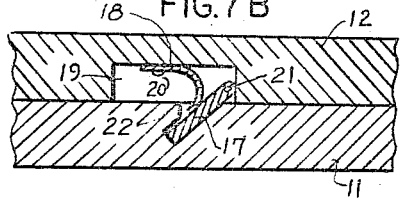
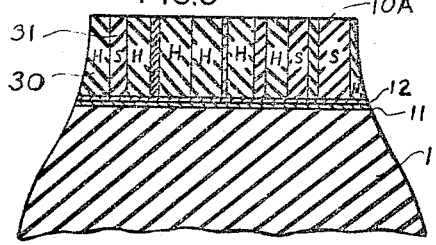
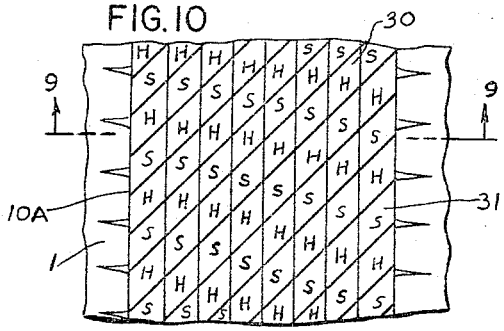
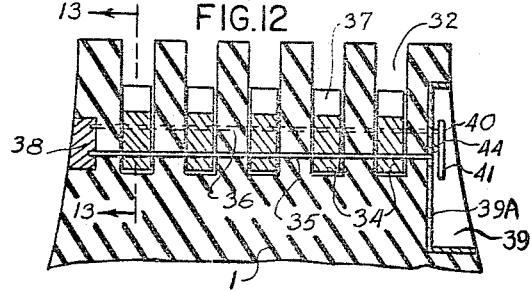
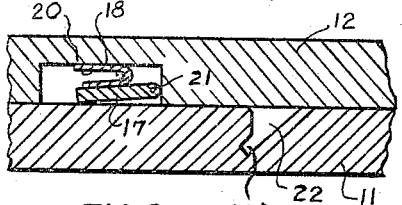
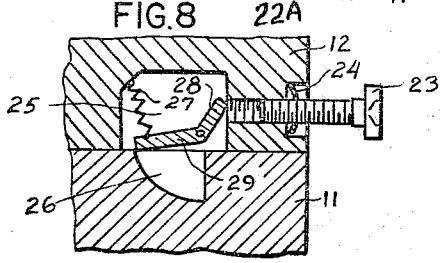
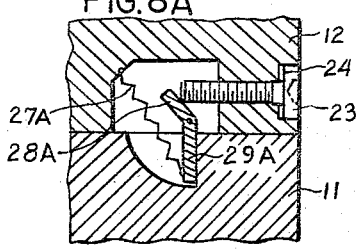
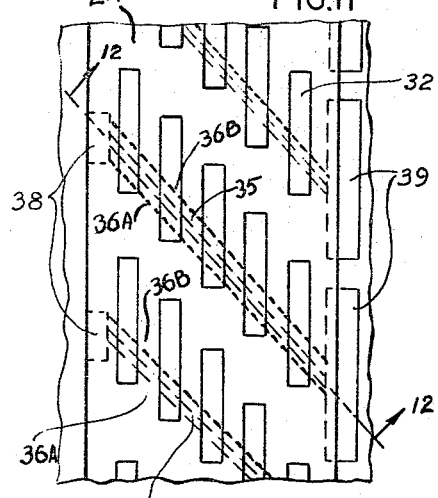
INVENTOR.
JOEL B. GUIN

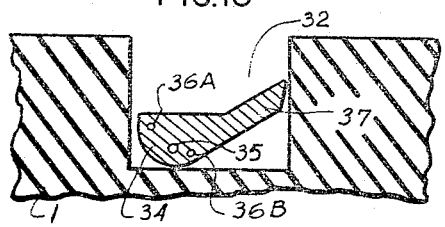
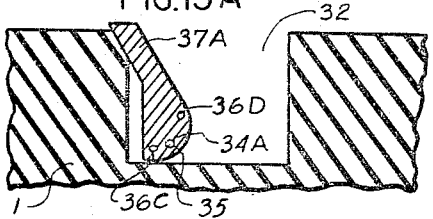
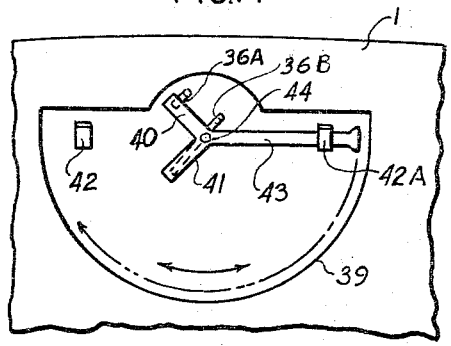
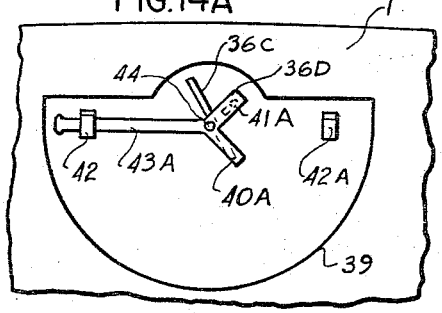
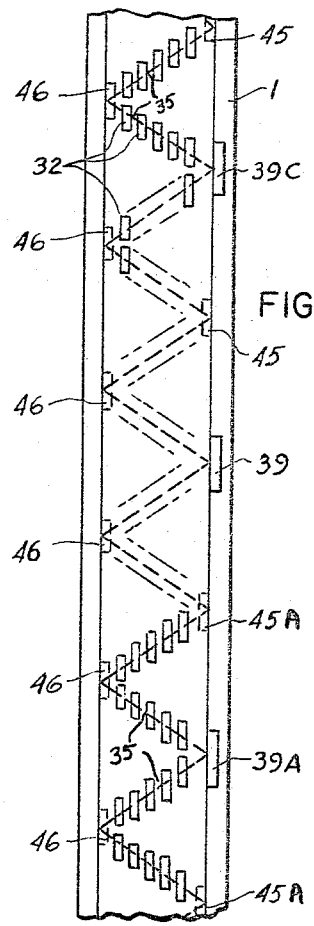
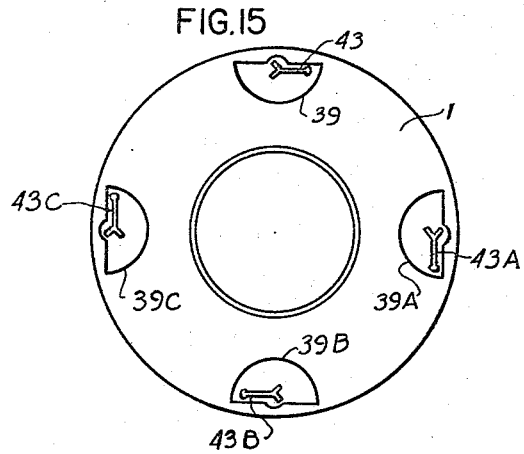
INVENTOR.
JOEL B. GUIN

United States Patent Office 3,331,423
Patented July 18, 1967

3,331,423
AUTOMOBILE TIRES
Joel B. Guin, 148 E. 48th St.,
New York, N.Y. 10017
Filed June 11, 1965, Ser. No. 463,129
11 Claims. (Cl. 152—313)

This invention relates to a multi-purpose tire which, in its various modifications, has these features:

Resilient material under pressure filling most of the air cavity, providing almost complete freedom from punctures;

A small tube of plastic or other material in the center of the resilient material, the tube being filled with air at a pressure adjusted so as to augment the pressure of the resilient material enough to bring the total pressure up to any set level;

Replaceable, removable treads of various types, one having a permanent snow-tire effect, one with normal tread, one with extensible and retractable anti-skid studs, etc.

Other objects are:

To provide more tire mileage per dollar;

To render punctures almost impossible;

To provide greater safety and traction throughout the life of the tire;

To reduce to a few seconds the time required to change from normal tread to snow tires or anti-skid tires; to provide smoother running tires, with less bounce on rough roads; and To provide a truck-tire that can carry heavier loads longer, more safely, more cheaply and with less damage to highways, than present tires, most of which are hard as rock and give the highway a damaging bump at every uneven place.

Other objects and advantages of the multi-purpose tire will become apparent when the detailed description is read in conjunction with the accompanying drawings in which FIG. 1 is a vertical section through part of a tire with normal treads, having a puncture-proof core of resilient material, in the center of which is a small inflated pressure tube;

FIG. 7 to FIG. 7B shows an alternate method of fastening a removable tread to the tire body, namely by plates that interlock at a number of places around the tire;

FIGS. 8 and 8A show a method of locking the outer steel band to keep it from sliding sideways off the inner steel band;

FIGS. 9 and 10 show an alternate type of removable tread, being composed of alternate sections of hard and soft material;

FIGS. 11–16 show various features of a modified tread, one containing anti-skid studs that may be extended and retracted quickly according to road conditions;

FIG. 11 is a top view showing the slits for the studs;

FIG. 12 is a view in cross-section, taken along line 12—12 in FIG. 11, but with the line drawn into the drafting plane to simplify drawing and description;

FIG. 13 shows an anti-skid stud in "down" position;

FIG. 13A shows an anti-skid stud in the "up" position;

FIG. 14 shows an opening for the lever that adjusts the studs, with the lever at the position that gives the studs a "down" position;

FIG. 14A shows the lever of FIG. 14 in the position that places the studs in the "up" position;

FIG. 15 shows a configuration allowing four openings for levers such as those in FIGS. 14 and 14A, around the tire;

FIG. 16 is a top view of the tire in FIG. 15, with the surface raised into the drafting plane, for the simplicity in drawing, showing the pattern of studs on the tread surface.

Figure 1:
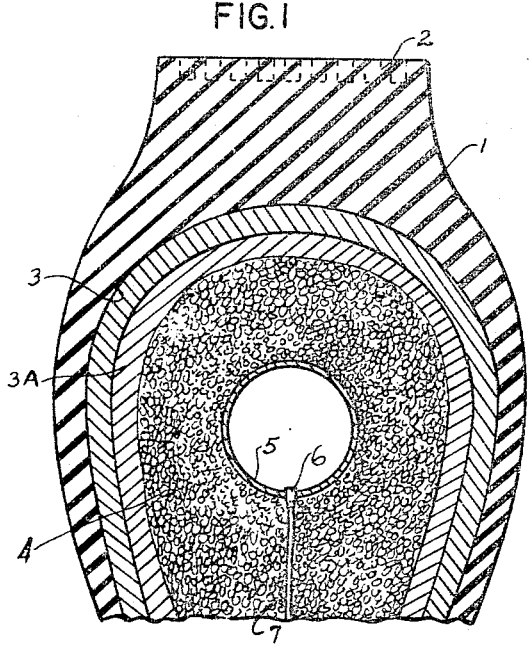

Turning now to the drawings, FIG. 1 is a cross-section of a puncture-proof tire 1 with normal treads 2, fabric layers 3 and 3A, and a filling of resilient material 4, in the center of which is a small pressure tube 5 which is inflated. Valve tube 7 brings air from the valve (not shown) into tube 5 through connection 6. In normal practice, resilient material 4 would be at a pressure a few pounds less than expected driving pressure, with tube 5 deflated; tube 5 would then be inflated enough to increase the pressure within the resilient material to the desired level.

The preferred material for the filling is polystyrene foam crystals which have the unusual feature of expanding, when heated, into air-filled bubbles occupying 40 times the volume. Other plastic materials, or foam rubber, could also be used, but most would be neither as light nor as resilient as polystyrene. Since the rest of the tire body can be made of thinner, cheaper materials (due to the reduced strain of the fabric layers), than conventional tires, the total cost of this tire will be within the range of present tires, or less costly.

Figure 2:
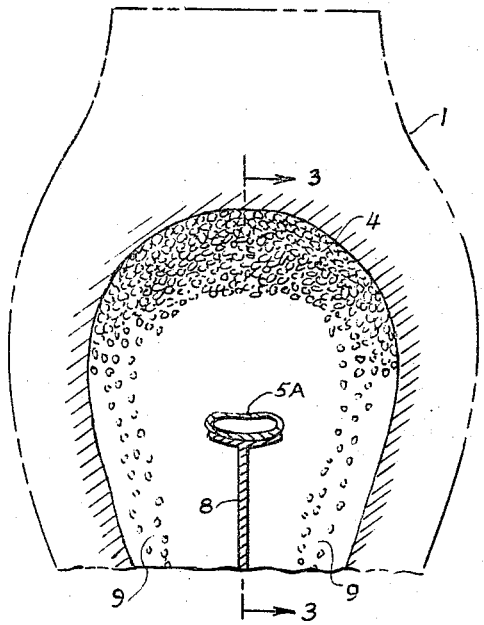
FIG. 2 shows the same tire with the pressure tube deflated.

FIG. 2 shows the extensions 8 from the tire rim-side which hold deflated pressure tube 5 to the lower part of the tire (not shown) next to the rim. The main function of these extensions is to hold pressure tube 5 in place while bubbles 9 (or crystals, if polystyrene foam) are pumped in during the manufacturing process and to stabilize it thereafter. To make the tire completely puncture-proof, a liberal amount of glue or adhesive that remains liquid even at road temperatures, and which does not evaporate easily, may be pumped into the tire along with bubbles or crystals 9. Even the largest nail would hardly produce a hole that would not be filled by foam and glue within a few seconds. Upon reaching a service station, or at his convenience, the driver could have the crystals or bubbles, and the glue replenished, and reinforcements placed in the hole.

Figure 3:
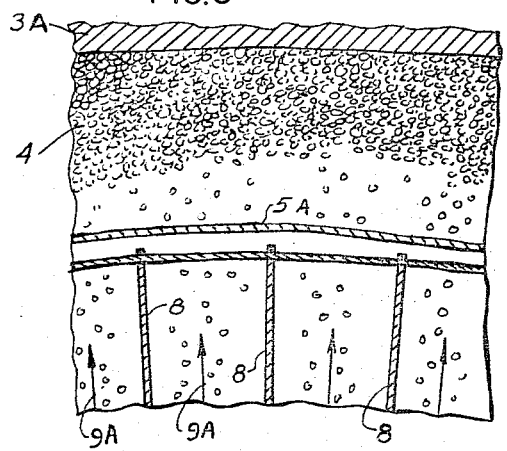
FIG. 3 shows a vertical section through the tire along line 3—3 in FIG. 2.

FIG. 3 is a vertical section along line 3—3 of FIG. 2, showing how extensions 8 are attached to the lower edge of pressure tube 5. The direction of incoming bubbles or crystals of resilient material is shown by arrows 9. This would be the arrangement for a filling process that involves pumping the material through a number of evenly-spaced tubes into a tire spinning rapidly in the horizontal plane, in order to secure even distribution throughout the tire. Filling without spinning can be accomplished by dividing the tire radially into a number of sections of equal volume, then filling each section with the same weight of crystals. This process is not shown here.

Figure 4:
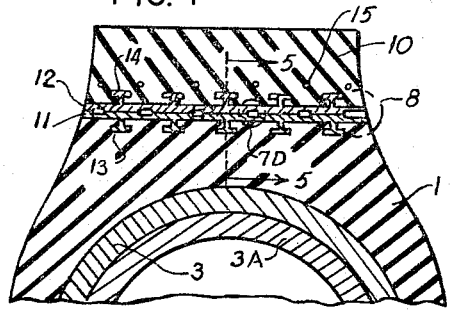
FIG. 4 shows a vertical section through a tire with removable tread.
Figure 5:
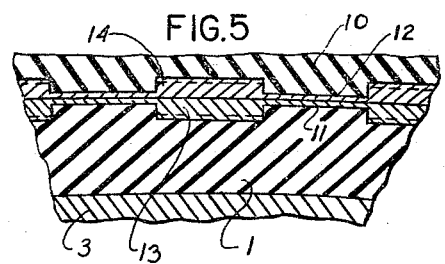
FIG. 5 is a vertical section along line 5—5 in FIG. 4.

FIGS. 4–5 show one way of attaching removable tread 10 to tire 1, by means of two horizontal bands of strong material which are held closely together by locking devices within recesses 7D between the bands. These locking devices may be of many different forms, the preferred form being shown in detail in FIGS. 7–7B. Steel wires 15 within tread 10 surround the tread and help hold it against band 12. The main tread fastening devices are T-studs 14 extending from the outer band 12 and T-studs 13 extending from inner band 11. FIG. 5 is a sectional view taken along line 5—5 in FIG. 4 showing the arrangement of upper T-studs 14 and lower T-studs 13 attached to bands 12 and 11 respectively. Fabric layer 3 is just below the rubber in tire body 1.

Figure 6:
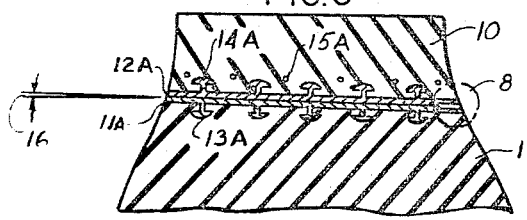
FIG. 6 shows a vertical section through a tire whose removable tread is held on partly by having the outer diameter of its steel band larger than the diameter of the other side.

FIG. 6 shows an alternate way of attaching removable tread 10 to tire 1, consisting of slanting bands of strong material, each band having a radius on the far side slightly greater than the radius on the near side, to prevent slippage toward the far side. Steel wires 15A within tread 10 surround the tread and help hold it against band 12A. The main tread-fastening devices are T-studs 14A extending from outer band 12A, and T-studs 13A extending from inner band 11A. Angle 16 is the angle with respect to the horizontal of the line separating bands 12A and 11A, the right side of which is lower than the left side, i.e. the radius of the far side is greater than the radius of the near side. Thus the outer band can not possibly slip over the far side of the inner band. Circled recess 8 for a locking device is shown in detail in FIGS. 8–8A. It must be noted that the same device can be used for locking horizontal bands, as in FIGS. 4–5 (circle 8).

FIGS. 7–7B show one way to fasten removable tread 10. Outer band 12 slides to the right on inner band 11, causing lock-plate 17, which turns on pivot 21 attached to band 11, to be pressed against steel spring 18, which is attached to outer band 12 by rivet (or weld) 20. In FIG. 7 lock-plate 17 is vertical; in 7A it has been pushed to a near-horizontal position, deflecting spring 18 into a U-shape, both being contained within indentation 19 in upper band 12, and both nearing indentation 22 in lower band 11.

FIG. 7B is the situation after indentation 19 goes beyond indentation 22, letting spring 18 push lock-plate 17 into indentation 22, whence it slides into extension 22A. These lock-plate devices are placed at a plurality of spots around the tire.

Located within recess 8 of FIG. 6 and enlarged in FIGS. 8 and 8A is the above-mentioned locking means working in cooperation with plates 17 of FIG. 7 to prevent the removable tread from slipping off the inner steel band 11: after outer band 12 has reached its extreme position to the right (FIGS. 7–7B), L-plate 29 in FIG. 8 is pushed into indentation 26 by means of screw 23 pressing against upper arm 28 of L-plate 29, which is attached to and turns on a pivot 28B fastened to upper band 12. Within band 12 is an indentation 25 for containing both L-plate 29 and its upper arm 28. A screw 23 enters band 12 it presses down on security-tension ring 24 till it is flat, as shown in FIG. 8A; at the same time it pushes upper arm 28 into position 28A, and causes L-plate 29 to assume position 29A against the side of indentation 26 within lower band 11; in the process this stretches spring 27 into position 27A.

This locking device can be used with both methods of attaching the removable tread to the tire: the slanting steel bands of FIGURE 6 and the horizontal steel bands with inter-locking device shown in FIGS. 7 to 7B, and 4–5.

FIGS. 9–10 show a form of the removable tread of FIGS. 4–6 modified to give a snow-tire effect throughout the life of the tread by means of alternating hard and soft parts made of rubber or other resilient material. Tread 10A is attached to outer steel band 12, which is fastened to inner steel band 11 attached to tire body 1. FIG. 9 is a cross-section of the tread taken along line 9—9 in FIG. 10. Hard sections 30 are marked "H" and soft sections 31 are marked "S." The shape of the hard section is optional—round, oval, star-shaped, etc.—but one preferred pattern is shown in FIG. 10: as the soft rubber diamond-shaped sections 31 wear out, a pattern of diamond-shaped hard sections 30 is presented to the pavement, and this pattern continues right down to the steel studs and/or wires. It will be noted that much of the weight is borne by the soft sections, thereby retarding the wear on the hard sections. The difference in hardness between the hard and soft sections will be determined by the intended use: with certain differences and on some types of surfaces the non-skid action will be greater than if air replaced the soft rubber.

FIGS. 11–16 show all essential features of a tread with anti-skid studs that are extensible and retractable within a few seconds. It may be applied to the removable tread devices shown in FIGS. 4 to 8A in which case it becomes a second modification of the removable tread; or it may be applied to a complete tire as shown in FIGS. 1 to 3 in which case it is a modification of the multi-purpose tire.

FIG. 11 is a top view of a tread 2A with built-in anti-skid studs 37 (FIG. 12) located in indentations 32. FIG. 12 is a vertical section along line 12—12 of FIG. 11, which is drawn back into the drafting plane to simplify the drafting and the description: nothing will be lost if it is recalled that the left side of FIG. 12 is farther away from the viewer than the right side. All studs 37 turn on hinge-rods 35 which penetrate the tread diagonally as in FIG. 11 or in a zig-zag pattern as in FIG. 16. In the former the hinge-rods 35 are anchored on the far-side by stud-fastening units 38 and on the near-side by fastenings within lever openings 39.

In FIG. 13 stud 37 is shown in the "down" position with curved lower portion 34 surrounding hinge-rod 35. The hole through 34 must be at an angle to conform to the angle of hinge-rods 35 as drawn in FIG. 11. On either side of hinge-rod 35 are wires 36 for raising and lowering the studs 37. These wires are tightened or loosened by levers 43 to 43C which are brought to rest in clamps 42 and 42A as shown in FIGS. 14, 14A and 15. These levers rotate on pivot-hinges 44 which are attached to the side 39A of lever opening 39 (see also FIG. 12). In FIG. 14 lever 43 is held in clamp 42A, upper arm 40 is in "up" position, and wire 36A attached to arm 40 is "slack"; lower arm 41 is in "down" position and wire 36B attached thereto is taut, i.e. it holds stud 37 "down" as shown in FIG. 13. When lever 43 is removed from clamp 42A it is turned clockwise and placed in clamp 42, assuming position 43A as shown in FIG. 14A; at the same time arm 40 has assumed position 40A and wire 36A has assumed position 36C, the "taut" position (see FIGS. 13A and 14A), causing stud 37 to move to "up" position 37A where it protrudes above the tread. At the same time lower arm 41 has assumed position 41A and wire 36B attached thereto has assumed "slack" position 36D (FIGS. 13A and 14A). Since studs 37 are made of a hard material such as metal, Bakelite or a tough plastic, and since they are used only a small fraction of the time—when roads are slick—while the tread is wearing during all driving, the studs, if properly used, will always be long enough to perform their anti-skid function. When the roads are dry again the driver can stop his car and readjust the two or more sets of levers on each tire. It is only necessary to remove lever 43A from clamp 42, turn it counter-clockwise to position 43 in FIG. 14, thereby loosening wire 36C which returns to "slack" position 36A which permits stud 37A to return to its "down" position 37, FIG. 13. Lower arm 41A returns to its normal position 41 at the same time, pulling wire 36D back into "taut" position 36B in which it holds down stud 37 within slit 32 against the centrifugal force of the spinning tire.

With practice a driver should be able to adjust the four levers 43, 43A, 43B and 43C, located within lever openings 39, 39A, 39B and 39C respectively, within 15 to 30 seconds. One delay may occur: in order to lower into the slits the studs which are pressed against the pavement under the tire it may be necessary to roll the car one or two feet forward or back; one such movement will suffice for all tires if all upper levers have already been adjusted. In all but the snowiest and iciest highway conditions two rear tires equipped with these anti-skid tires will suffice for skillful drivers.

The preferred number of levers for each tire is four, as shown in FIG. 15, which are designed to operate all wires of a tire 1 as shown in FIG. 16. The wires from lever opening 39A on the right form a large M stretching from 39A as the center across the tire through studs 37 within slits 32 to fastening units 46 on the left, where they run around a stable bolt or hook and return to the right where they are fastened within fastening units 45A. Since hinge-rods 35 must always be stable and taut they are attached permanently within fastening units 46 and 45A on either side. The pattern of the stud-adjusting wires 36A, 36B, etc. is shown in FIG. 11 but is not repeated in FIG. 16, due to limited space.

I claim:
1. A multi-purpose pneumatic tire comprising:
 a filling for the air cavity inside the tire, made of resilient material consisting of a multiplicity of minute individual closed cells containing a gas under pressure, with small amounts of gas between and among the closed cells, the whole having a substantially uniform pressure throughout;
 conventional fabric layers interspersed with resilient material surrounding said air cavity but lacking most of the conventional tread of pneumatic tires;
 a peripheral horizontal inner band of durable semi-rigid material surrounding said tire body, and attached thereto by a plurality of fastening means;
 a removable tread which consists of
 a horizontal outer band of durable material around which and to which a layer of resilient tread material is fastened by a plurality of fastening means, said outer band being detached from but fitting snugly around said peripheral horizontal inner band and attached thereto by a plurality of locking means each of which comprises
  an indentation on the under side of the outer band,
  a pivot within said indentation attached to the side of said outer band,
  a lock-plate attached to and turning on said pivot,
  a spring attached to the top of said indentation in the outer band, and pressing against said lock-plate,
  an indentation on the upper side of said inner band, and
  an extension of said indentation of the same size and shape as the end of the locking plate so that the locking plate may enter said extension and hold the outer band snugly against the inner band.

2. In combination, a pneumatic tire according to claim 1, a small bicycle-tube-shaped air container surrounding said tire body within and near the center of said resilient filling material, made of an elastic material and containing air under pressure;
 a plurality of extensions attached to the rim-side of said tire body leading out to and attached to the inner side of said air container which is thereby stabilized during the manufacturing process and held in the center of said resilient filling material thereafter; and
 a valve tube attached at one end to said air container and at the other to a conventional air valve to bring air into said air container to inflate it and to compress the resilient material.

3. In combination, a pneumatic tire accorrding to claim 1, and a liberal amount of adhesive substance in liquid form which retains its liquid form with minimum evaporation at all road temperatures usually encountered, said adhesive substance being forced into the air cavity during the manufacturing process, the purpose of said adhesive substance being to fill and seal off all puncture holes in said tire.

4. A multi-purpose pneumatic tire having mounted upon its periphery a tread of durable material in which are selectively placed, at the surface, a multiplicity of slit indentations each containing an anti-skid stud mounted in such way as to be extendable above the surface thereof for anti-skid use and retractable below the surface thereof when not needed, by means of the following devices:
 a plurality of fastening units at strategic places on the side of the tread, the purpose of each unit being to hold firmly the wire and rod devices described below, which control the anti-skid studs;
 a plurality of lever openings at strategic places on the side of the tread opposite said fastening units;
 a plurality of bifurcated levers, one placed within each of said lever openings and rotatable on a pivot-hinge attached to the side of said lever opening, each arm of the fork being attached to one of the two wires that control the anti-skid studs;
 a plurality of lever-holder clamps, two fastened to the side of each of said lever openings, the clamp on the right being placed to hold said lever for the "down" position of said studs, and the clamp on the left being placed to receive the lever after it has been turned clockwise from its "down" position for studs to its "up" position for studs;
 a plurality of "down" position wires, one attached to the lower arm of each of said bifurcated levers and running through the lower part of a plurality of anti-skid studs to a fastening unit on the other side of the tread so as to hold said stud "down" within its slit indentation against the centrifugal force of the spinning tire when said wire is taut;
 a plurality of "up" position wires, one attached to the upper arm of each of said bifurcated levers and running through the same number of anti-skid lower portions as are penetrated by the "down" position wires just described, the wire extending to the other side of the tread in such a manner as to hold the anti-skid stud up, protruding from its slit indentation, in performing its anti-skid function, when said "up" position wire is taut; and
 a plurality of stud hinge-rods each running from one side of the tread to the other, each hinge-rod between an "up" position wire and a "down" position wire so that the anti-skid stud involved may turn up or down with the hinge-rod serving as a pivot, each hinge-rod running through holes in the lower part of said studs, each of which is located in one of said slit indentations in the surface of the tread, the hinge-rod holding the stud firmly either in the "up" or "down" position depending on whether the "up" position wire or the "down" position wire is taut.

5. A multi-purpose pneumatic tire comprising:
 a filling for the air cavity made of resilient material consisting of a multiplicity of minute closed cells containing a gas under pressure, the whole having a substantially uniform pressure throughout;
 conventional fabric layers interspersed with resilient material surrounding said air cavity;
 a tire tread comprising alternate hard and soft sections of resilient material attached to and surrounding the periphery so that as the soft sections wear away the tops of the hard sections will remain, resulting in a snow-tire effect throughout the life of the tread, said sections of wear-resisting hard resilient material alternating both circumferentially around the tire and transversely across the tire tread with said sections of soft resilient material.

6. A multi-purpose pneumatic tire comprising:
 a filling for the air cavity inside the tire, made of resilient material consisting of a multiplicity of minute individual closed cells containing gas under pressure with small amounts of gas between and among the closed cells, the whole having a uniform pressure throughout;
 conventional fabric layers interspersed with resilient material surrounding said air cavity and covered with a limited quantity of the resilient tread material of conventional tires;

a peripheral slanting inner band of durable semi-rigid material surrounding the body of said tire and attached thereto by a plurality of fastening means, the surface of said inner band slanting from its outer to its inner edge, the inner band being a foundation around which, upon which and to which a removable tread can be fastened;

a slanting outer band of durable semi-rigid material around which and to which a layer of resilient tread material is fastened by a plurality of fastening means, said slanting outer band being detached from but fitting snugly around said peripheral slanting inner band to facilitate mounting and demounting said slanting outer band, to insure a tight fit and to promote a better attachment of the outer to the inner band by making it impossible for the former to slide beyond the far side of the latter, the two being positively attached by a plurality of locking means each of which comprises an indentation on the under side of the outer band, a pivot within said indentation, attached to the side of said outer band, a lock-plate attached to and turning on said pivot, a spring attached to the top of said indentation in the outer band, and pressing against said lock-plate, an indentation on the upper side of the inner band, and an extension of said indentation of the same size and shape as the end of the locking plate, for the locking plate to enter and thereby hold the outer band snugly against the inner band.

7. A multi-purpose tire as described in claim 6 in combination with a removable tread of durable resilient material attached securely to said slanting outer band by a plurality of fastening means, the tread pattern of said durable tread being conventional.

8. A multi-purpose tire as described in claim 6 in combination with a removable tread of durable resilient material attached securely to said slanting outer band by fastening means such as wires imbedded in said durable material and encircling the outer band and T-studs attached to and protruding from the outer band into the material of the removable tread which is made of a multiplicity of alternating hard and soft sections of resilient material arranged in rows around the periphery in such way that as the soft sections wear away the tops of the hard sections remain to give a snow-tire effect throughout the life of the tread, which is increased by the soft sections taking some of the pressure and wear from the hard sections.

9. A multi-purpose pneumatic tire as described in claim 6, in combination with a small bicycle-tube shaped air container surrounding said tire within and near the center of the resilient filling material, made of an elastic material and containing air under pressure;

a plurality of extensions attached to the rim-side of said tire, leading out to and attached to the inner side of the air container which is thereby stabilized during the manufacturing process and held in the center of said resilient material thereafter; and a valve tube attached to one end of said air container and at the other end to a conventional air valve to bring air into the air container to inflate it and to compress the resilient material; and a liberal amount of adhesive substance in liquid form which retains its liquid form with minimum evaporation at all road temperatures usually encountered, said adhesive substance being forced into the air cavity during the manufacturing process, the purpose of said adhesive substance being to fill and seal off all puncture holes in said tire.

10. In a multi-purpose tire, a removable tread of durable resilient material attached to a slanting outer band having devices by which it is attachable to a corresponding peripheral slanting inner band circling the tire body of a pneumatic tire, the removable tread being attached to said band by fastening means and having around its periphery a plurality of anti-skid studs each contained within one of a plurality of slit indentations within said durable resilient material, the studs being extendable from the tread surface for anti-skid use and retractable thereinto when not in use, by means of the following devices:

a plurality of fastening units at strategic places on the side of said removable tread near said horizontal band, the purpose of each unit being to hold firmly the wire and rod devices described below which control said anti-skid studs;

a plurality of lever openings selectively placed on the side of the removable tread near said slanting outer band;

a plurality of bifurcated levers, one placed within each of said lever openings and rotatable on a pivot-hinge attached to the side of the lever opening, each arm of the fork being attached to one of two wires that control the anti-skid studs;

a plurality of lever-holder clamps, two fastened to the side of each of said lever openings, the clamp on the right being placed to hold said lever for the "down" position of the anti-skid studs, and the clamp on the left being placed to receive the lever after it has been turned clockwise from its "down" position for the studs to its "up" position for studs;

a plurality of "down" position wires, one attached to the lower arm of each bifurcated lever and running through the lower parts of a plurality of said anti-skid studs to a fastening on the other side of the tread so as to hold said studs "down" within their slit indentations the tautness of said wires resisting the centrifugal force of the spinning tire;

a plurality of "up" position wires one attached to the upper arm of each bifurcated lever and running through the lower portions of the same number of anti-skid studs as are penetrated by the "down" position wires just described, the wire extending to the other side of the tread so as to hold the anti-skid studs in "up" position, protruding from the slit indentations to impinge on any slippery surface and prevent skidding, the tautness of the wires resisting the impact thereagainst; and a plurality of stud hinge-rods each running from one side of the tread to the other, each hinge-rod between an "up" position wire and a "down" position wire, the two wires communicating with the same anti-skid stud which is thereby held "up" or "down" respectively, each hinge-rod running through holes in the lower part of the studs, each of which is located in one of said slit indentations in the tread surface, the hinge-rod holding the stud firmly either in the "up" or "down" position according to which of said wires is taut.

11. A multi-purpose pneumatic tire having conventional tread in which are selectively placed a plurality of slit indentations each enclosing an anti-skid stud extendable above the tread surface for anti-skid use and retractable below the tread surface when not in use, by means of the following devices:

a plurality of fastening units strategically placed on the side of the tire tread to hold firmly the wire and rod devices described below which control said anti-skid studs;

a plurality of lever openings selectively placed on the side of the tread near the junction thereof with the tire body;

a plurality of bifurcated levers, one placed within each of said lever openings and rotatable on a pivot-hinge attached to the side of the lever opening, each arm of the fork being attached to one of two wires that control the anti-skid studs;

a plurality of lever-holder clamps, two fastened to the side of each of said lever openings, the clamp on the right being placed to hold said lever for the "down" position of the studs, and the clamp on the left being placed to receive and hold the lever after it has been turned clockwise from its "down" position for studs to its "up" position for studs;

a plurality of "down" position wires, one attached to the lower arm of each of said bifurcated levers and running through the lower part of a plurality of anti-skid studs to a fastening unit on the opposite side of the tread so as to hold said stud "down" within its slit indentation against the centrifugal force of the spinning tire when said wire is taut;

a plurality of "up" position wires one attached to the upper arm of each of said bifurcated levers and running through the same lower portions of anti-skid studs as the "down" wires just described, the wire extending to the opposite side of the tread in such manner as to hold the anti-skid stud "up" protruding from its slit indentation to perform its anti-skid function when the "up" position wire is taut; and a plurality of stud hinge-rods each running from one side of the tread to the other, each hinge-rod placed between an "up" and a "down" position wire so that the anti-skid stud that rotates thereon may turn up or down with the hinge-rod serving as a pivot, each hinge-rod penetrating holes in the lower part of said studs, each of which is located in one of said slit indentations cut in the surface of said tread, the hinge-rod holding the stud firmly in the "up" or "down" position according to which of the wires is taut.

References Cited

UNITED STATES PATENTS

| | | | |
|---|---|---|---|
| 1,222,283 | 4/1917 | Gray et al. | 152—176 X |
| 1,294,420 | 2/1919 | Dahl | 152—313 X |
| 1,501,069 | 7/1924 | Smith | 152—346 |
| 1,585,875 | 5/1926 | Price | 152—313 X |
| 2,239,070 | 4/1941 | Work et al. | 152—211 |
| 3,022,810 | 2/1962 | Lambe | 152—313 X |
| 3,120,255 | 2/1964 | Coppola | 152—208 |

ARTHUR L. LA POINT, *Primary Examiner.*

C. W. HAEFELE, *Assistant Examiner.*